United States Patent [19]
Harold

[11] Patent Number: 5,301,455
[45] Date of Patent: Apr. 12, 1994

[54] NO-SWALLOW DEVICE FOR FISH HOOKS AND THE LIKE

[76] Inventor: Billy E. Harold, 32775 Missaukee Ct., Westland, Mich. 48185

[21] Appl. No.: 864,403

[22] Filed: Apr. 6, 1992

[51] Int. Cl.⁵ .............................................. A01K 83/00
[52] U.S. Cl. .................... 43/42.74; 43/43.16
[58] Field of Search .................. 43/43.2, 43.15, 43.16, 43/42.74, 43.1, 42.1

[56] References Cited

U.S. PATENT DOCUMENTS

| | | | |
|---|---|---|---|
| 699,397 | 5/1902 | Lacey | 43/43.16 |
| 2,128,315 | 8/1938 | Parker | 43/43.2 |
| 2,790,265 | 4/1957 | Flynn | 43/43.15 |
| 3,101,565 | 8/1963 | Hoder | 43/43.16 |
| 3,118,245 | 1/1964 | Shriver | 43/43.15 |
| 4,473,966 | 10/1984 | Neal | 43/43.1 |
| 4,987,696 | 1/1991 | Cook | 43/43.16 |
| 5,022,177 | 6/1991 | Gibson | 43/42.11 |
| 5,065,542 | 11/1991 | Lindaberry | 43/42.74 |

Primary Examiner—Kurt Rowan
Attorney, Agent, or Firm—Krass & Young

[57] ABSTRACT

A device for supporting fish hooks and the like from a fishing line such that fish are prevented from swallowing the hook more than mouth deep. The device includes a vertical shank suspended from the fishing line, a lateral guard member attached to the shank, and a support for attaching the fish hook at or below the level of the guard structure. In one embodiment, the lateral guard is a removable guard wire which is frictionally locked to the shank upon insertion through tubular lateral supports. In a further embodiment, the invention includes a swing limit retainer to prevent the fish hook from snagging on the guard wire.

31 Claims, 5 Drawing Sheets

NO-SWALLOW DEVICE FOR FISH HOOKS AND THE LIKE

FIELD OF THE INVENTION

A device for supporting fish hooks or similar fishing apparatus from a fishing line in a manner such that it is impossible for the fish to swallow the hook more than mouth deep.

BACKGROUND OF THE INVENTION

I am an avid fisherman and, like many other fishermen today, enjoy fishing for the thrill of the catch more than as a utilitarian means of providing food. Many fishermen accordingly prefer to throw the fish back for environmental reasons.

A fish hooked by the mouth is ordinarily not mortally wounded, and quickly recovers once thrown back in the water. Many times, however, the fisherman is obliged to kill the fish he intended to throw back because the hook has been swallowed more than mouth deep. Simply snipping the line is not satisfactory, first because the hook embedded internally in the fish will usually kill it, and second because an expensive hook and lure is lost.

The solution is to prevent the fish from being able to swallow the hook more than mouth deep. The prior art has not adequately recognized or solved this problem, and accordingly does not teach any structure which is simultaneously effective, inexpensive and easy to manufacture and use. U.S. Pat. No. 4,987,696 to Cook discloses a fish hook having one or more wing members fastened crosswise to the hook shank, the wing or wings disposed at an angle between 30° and 60° from the shank. The purpose of the wing is to create a hooking moment when the line is pulled to rotate the barb of the hook up and into the mouth of the fish. The wing is also briefly described as decreasing the probability of the hook being swallowed by a fish; however, the wing is inadequate with respect to size, placement and ease of construction to provide a satisfactory solution to the hook swallowing problem.

U.S. Pat. No. 5,022,177 to Gibson discloses a one-piece wire harness for converting regular fishing lures into spinner bait lures. An upper portion of the wire harness is bent at approximately right angles to the vertical shank of the harness to support a spinner.

U.S. Pat. No. 4,473,966 to Neal discloses a combination bobber and fish hook remover in which a short cross bar is fastened on a vertical hollow rod to provide a support about which the fish line is tied.

There are also many prior art devices known as "weedless" hooks or lures, usually providing a bar or ground member attached to the shank of the fish hook and extending downwardly at an angle to cover the point of the hook. These weed guards do not function adequately to prevent the swallowing of the hook by a fish more than mouth deep, largely due to their position on the hook itself, the angle at which they are set, and their direction of yield or give.

SUMMARY OF THE INVENTION

My invention is the first to truly recognize and provide an effective, realistic solution to the hook swallowing problem encountered in sport fishing. The invention provides effective, economical, easy to use support structure for suspending a fish hook or similar fishing apparatus from a fishing line to absolutely eliminate any risk that a particular fish might swallow the hook more than mouth deep. The invention is virtually foolproof, can be used with any off-the-shelf fish hook or related equipment, can be quickly and easily broken down for efficient storage when not in use, and will not interfere with the fish hook or with any aspect of normal sport fishing.

It is to be understood that while I refer to my invention as being used to support a "fish hook", it is to be understood that "fish hook" can include any known structure suspended from the end of a fishing line for the purpose of attracting and catching fish.

The invention in its broadest form generally comprises a fish hook support structure in the form of an upside-down T or cross having a vertical support shank whose upper end is attached directly to a fishing line, a long lateral swallow guard connected to and extending crosswise from the vertical shank, and a fish hook connection at or below the lateral guard from which the hook depends so as to freely swivel or rotate, much the same as if connected to ordinary fishing line. The lateral guard is connected to the vertical shank at or near the point from which the fish hook depends to prevent the fish from swallowing the hook more than mouth deep; i.e., to prevent the hook from being swallowed farther than its own length. The lateral guard is stiff enough that a fish cannot force it upwardly with respect to the support structure, and is wider than the fish's mouth. The length of the lateral swallow guard and its spacing from the hook can be varied depending on the type of fish being sought. When fishing for larger fish, the length and spacing of the lateral swallow guard will be greater; when fishing for smaller fish, the length and spacing of the swallow guard can be made smaller.

In a preferred form the entire invention is made from small gauge metal wire, although those skilled in the art will recognize that other materials can be used. In several versions the invention can be manufactured using inexpensive wire components commonly found in fishing supply stores, as will be described below.

The lateral swallow guard can be integral with the overall device, or can be removable so that the device can be broken down for easy storage when not in use.

In one embodiment the vertical support shank of the device branches at its lower end to form two lateral support points for the swallow guard. In an embodiment in which the swallow guard is removable, these lateral supports are in the form of one or more short tubular supports extending laterally of the vertical shank. The swallow guard is in the form of a relatively stiff wire member which can be inserted through the tubular supports and axially locked thereto.

In a further embodiment of the invention, the lateral guard is a wire member having a misaligned center portion which frictionally deforms and engages the tubular supports when inserted to lock the guard to the supports. In yet another embodiment, the lateral guard comprises two wire elements, each provided with its own locking structure for engaging one of the tubular supports.

A further feature of the invention is a swing limit retainer positioned on the device to limit the swing arc of the fish hook depending therefrom. In certain situations, for example when casting, a long hook might tend to swing up and become entangled with the lateral swallow guard. This can be prevented by limiting the upward swing arc of the hook relative to the support structure. The swing limit retainer can be made integral with the support structure, or can be provided as a removable or aftermarket add-on. In one embodiment the swing limit retainer comprises a V-shaped element supported from the swallow guard or from the lateral supports, surrounding the point at which the fish hook swivels relative to the support structure. The retainer is both axially and rotationally locked with respect to the swallow guard and the vertical shank, and is provided with an aperture in the apex of the V through which the fish hook depends.

In still another embodiment of the invention, the vertical shank or another rigid member aligned with the shank extends below the lateral swallow guard. The fish hook is attached to swivel at the end of this extension. The rigid extension distances the hook far enough from the swallow guard so that the hook cannot swing up and snag the guard.

These and other advantages of the present invention will be apparent from a further reading of the specification below.

DETAILED DESCRIPTION OF THE DRAWINGS

The following description is in reference to the attached drawings. Like reference numerals are used throughout for the various embodiments where the structure is the same or similar.

Figures 1, 2:
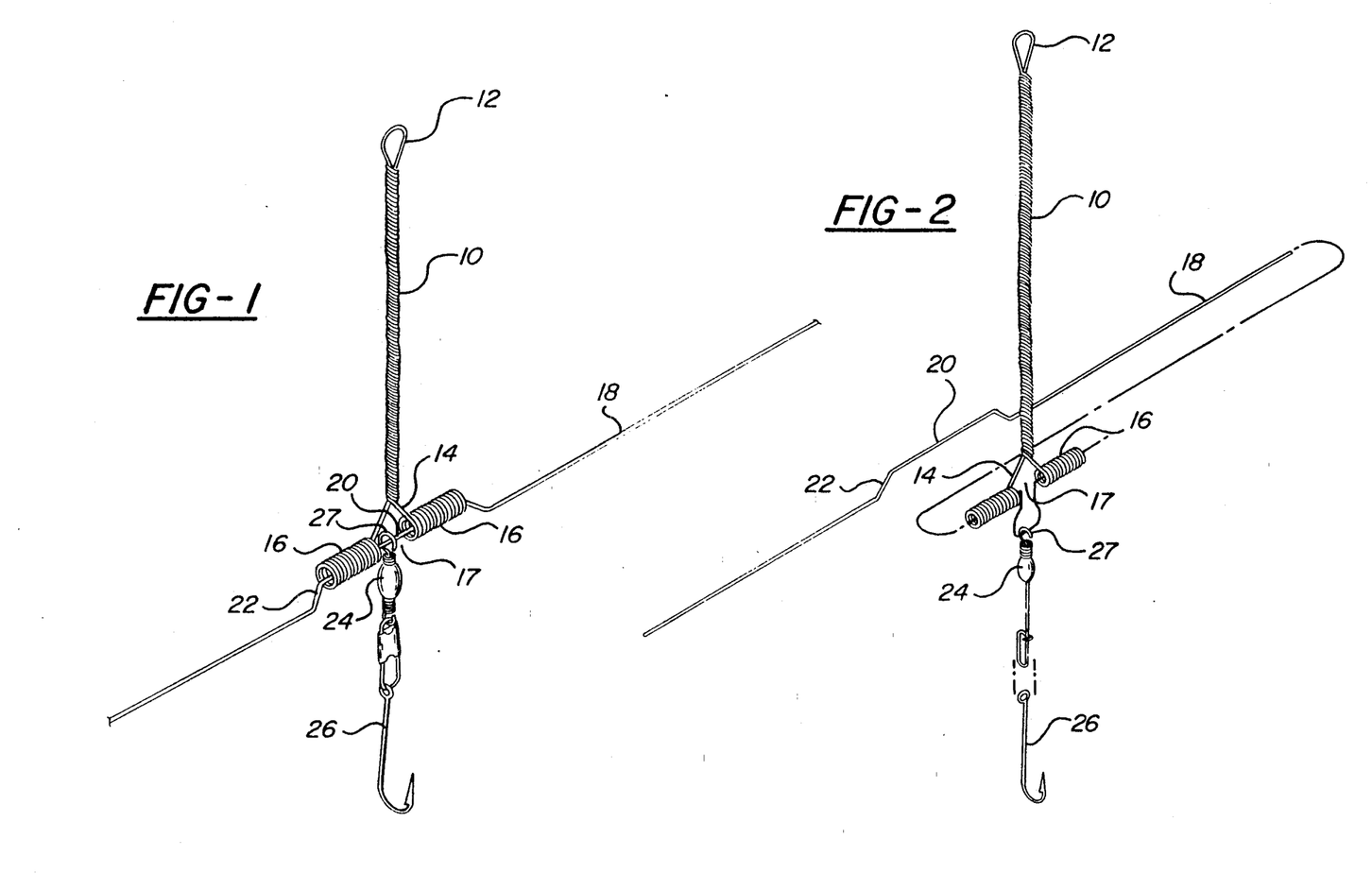
FIG. 1 is a perspective view of a first embodiment of the invention having a removable swallow guard.
FIG. 2 is an exploded perspective view of the invention of FIG. 1.

Referring now to FIGS. 1 and 2, a first embodiment of the present invention is shown generally as a fish hook support structure having the form of an upside down T from which a standard fish hook and swivel leader are supported. The invention comprises a vertical support shank 10 formed from twisted or braided metal wire, with an eye 12 at its upper end to which fishing line (not shown) is tied. Shank 10 branches at its lower end at 14 to form lateral tubular supports 16 in the form of wire spring coils. Coil supports 16 are coaxial and are slightly spaced at 17. This support structure is commonly known as a "spreader" and can be found at most fishing supply stores, its usual purpose being to fish with more than one hook/line combination at a time.

A one-piece lateral swallow guard 18 extends through coil support 16 cross-wise of shank 10. Swallow guard 18 is in the form of a straight wire with an offset or misaligned center portion 20 approximating the end-to-end length of coil supports 16. Misaligned center portion 20 is formed, for example, by crimping a straight piece of wire. Misaligned portion 20 is connected to the coaxial main portion of the wire by angled cam portions 22. A standard hook and swivel leader arrangement 24,26 is connected to the support by attaching eye 27 to the segment of misaligned portion 20 extending between coil supports 16 and space 17. It will be apparent to those skilled in the art that the hook and swivel leader structure 24,26 is free to swivel or pivot about its point of attachment to the support.

Referring specifically to FIG. 2, swallow guard 18 is inserted into and removed from coil supports 16 axially. When guard 18 is inserted through the lateral coil springs, the crimped or misaligned portion 20 deforms these springs enough to create a tight frictional lock between the springs and the wire. Misaligned portion 20 is offset from the axis of the free ends of guard wire 18 a distance at least equal to, and preferably slightly greater than, the inner diameter of the coil spring 16. As guard 18 is inserted, a leading one of angled cam portions 22 first interferingly engages and begins deforming the coil spring until that leading angled portion 22 is pushed all the way through the spring. Coil spring 16 resumes its normal shape when it engages misaligned portion 20. The same thing happens as guard wire 18 is further pushed through the remaining coil spring, until guard wire 18 literally pops into place as shown in FIG. 1.

Since misaligned portion 20 approximates the end-to-end length of the two coil springs 16, guard wire 18 is axially locked with respect to the coil springs 16 by angled portions 22. Guard wire 18 cannot be removed unless a sufficient axial force is applied to force the angled cam portions 22 through coil springs 16. The nature of this locking mechanism is such that insertion and removal are accomplished in a smooth, but discernible, two-step motion as the leading angled portion 22 of the misaligned crimp 20 is forced through each coil spring 16.

It will be clear from the above that the fish hook and swivel leader structure are connected to the support when one end of guard wire 18 is first positioned in space 17 between coil springs 16. The fish hook and swivel leader 24,26 are locked into place between the coil supports when guard wire 18 is assembled as shown in FIG. 1.

While the above-described embodiment of the invention is described as being made from small gauge metal wire, it will be apparent to those skilled in the art that other materials may be used. Also, the body of the support (the "spreader") comprising shank 10, eye 12, branches 14 and support 16 do not have to be formed from wire, but could be stamped from metal or molded from plastic, as desired. Lateral supports 16 do not have to be in the form of coil springs, but can comprise other types of spread supports. Where the lateral supports are referred to as tubular, it is to be understood that this can include tubes of rectangular or other cross-section, so long as they operate to adequately support and lock the guard wire. Also, while lateral supports 16 are disclosed in the illustrated embodiment as two spaced elements, a single continuous support is possible as long as the fish hook can be attached in the vicinity of the junction between the vertical shank and the lateral support.

It is important to maintain the spacing 17 between coil supports 16 at a minimum to prevent excessive flexibility in branches 14 and supports 16 when force is applied along the axis of the shank, for example when a fish is being hauled in. By keeping this spacing at a minimum, the moment tending to deform guard wire 18 and coils 16 is kept at a minimum as well.

The use of small gauge metal wire is advantageous because it is desirable to keep the support and guard structure as slender and unobtrusive as possible to avoid spooking fish. The guard wire and support structure can also be painted to reduce reflection and help it blend in with the aquatic environment in which it is being used.

Figures 3, 5:
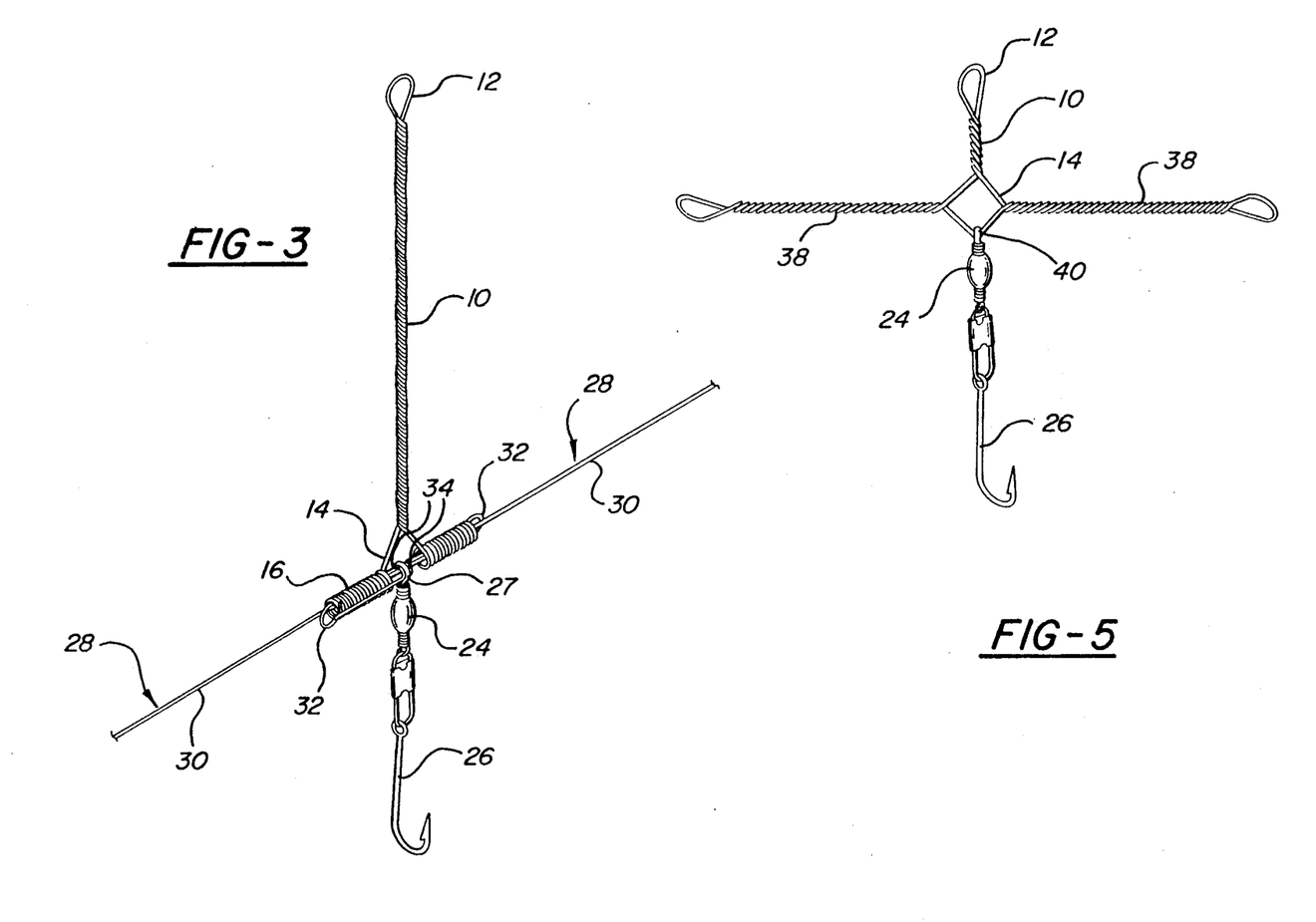
FIG. 3 is a perspective view of a second embodiment of the invention having a two-piece removable swallow guard.
FIG. 5 is a perspective view of a third embodiment of the invention in which the swallow guard is integral with the overall support structure.
Figures 4, 6:
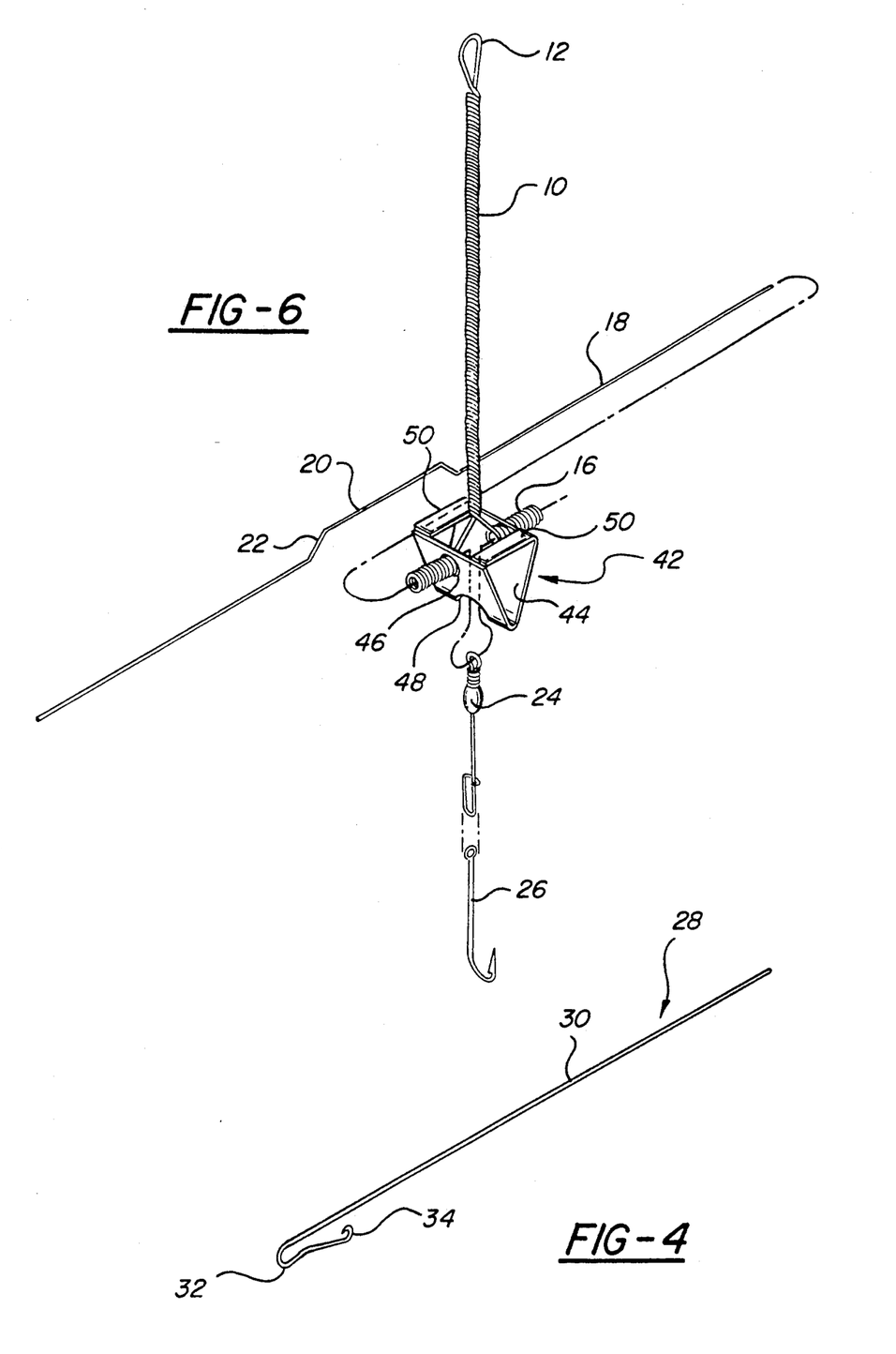
FIG. 4 is an exploded perspective view of the invention of FIG. 3.
FIG. 6 is a view of the invention as shown in FIG. 2, further including one embodiment of a swing limit retainer.

Referring now to FIGS. 3 and 4, a second embodiment of the invention is shown in which the lateral swallow guard comprises two half portions 28, each of which is inserted through coil springs 16 from opposite sides as shown in FIG. 4. Each portion 28 of the guard wire includes a straight main portion 30, a spring loop 32 best described as shown as being keyhole-shaped, and a clasp hook 34 at the free end of spring loop 32 which is normally biased to an open position away from main portion 30, but which can be snapped into locking engagement with main portion 30 somewhat in the manner of a safety pin.

Main portion 30 of each half 28 of the guard wire is inserted through both coil springs 16 until the coil spring through which it was first inserted is substantially enclosed within spring loop 32. At this point clasp hook 34 has cleared the coil spring and is free to be hooked to main portion 30 at space 17 between the coils. As in the embodiment of FIGS. 1 and 2, swivel leader and hook structure 24,26 is connected to the support by positioning eye 27 in space 17 and inserting the ends of wires 28 therethrough as they are pushed through the coil springs.

The two-piece embodiment of FIGS. 3 and 4 provides a stronger locking engagement between guard wire portions 28 and the coil springs than the frictional locking engagement between one-piece guard wire 18 and the coil springs in the embodiment of FIGS. 1 and 2. Guard wire portions 28 in the embodiment of FIGS. 3 and 4 can only be removed by unhooking clasp hooks 34, which is almost impossible to do by accident. No amount of axial force can remove either of portions 28 until the clasp hooks 34 are released.

The two-piece embodiment of FIGS. 3 and 4 also provides increased stiffness and strength at the point of connection between the swallow guard and hook and leader structure. Eye 27 is supported by two thicknesses of wire rather than one, making the swallow guard less likely to bend or break with the weight of a fish on the hook.

Referring now to FIG. 5, a third embodiment of the present invention is shown comprising a one-piece support structure 10,12,14 with integral swallow guards 38 and hook support 40. In the embodiment shown, the device is formed from a single piece of twisted or braided wire. As in the above embodiments, use of the particular materials shown is not necessary, as will be apparent to those skilled in the art. For example, the support could be stamped or molded from a single piece of metal or plastic.

Figure 7:
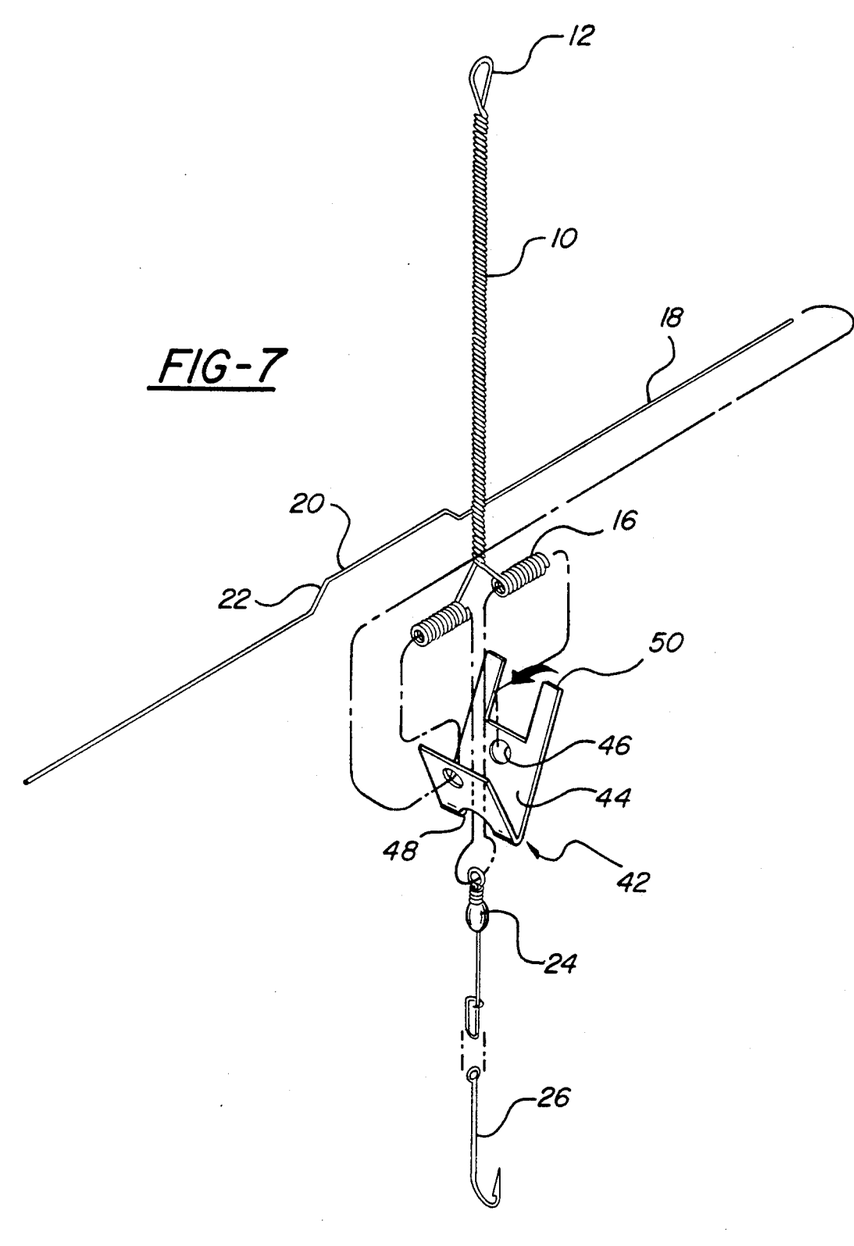
FIG. 7 is a view of the invention in FIG. 6 wherein the swing limit retainer is shown in the disassembled condition.

Referring now to FIGS. 6 and 7, a fourth embodiment of the invention is shown in which a swing limit retainer 42 has been added to the invention of FIGS. 1 and 2. It will be apparent to those skilled in the art that swing limit retainer 42 can be used equally with any of the embodiments of the invention disclosed.

While it is advantageous to pivotally attach leader and hook structure 24,26 as close to swallow guard 18 as possible, in order to limit the distance the fish can take the hook into its mouth, it creates a disadvantage in that the freely swinging hook might swing up and become tangled with guard wire 18, for example when casting. To prevent this from happening it is necessary to limit the swing arc of hook 26 below the level of guard wire 18.

In the illustrated embodiment of FIGS. 6 and 7, swing limit retainer 42 comprises a V-shaped hollow element supported from coil springs 16 and surrounding the swivel point of hook 26 located at the spacing 17 between the coil springs. The swing limit retainer preferably comprises a sheet of thin, deformable material such as sheet metal which retains its shape once deformed. It is initially formed as best shown in FIG. 7 as a rectangular sheet of metal provided with three apertures 46,48 and opposed locking tabs 50. The sheet is folded in half across aperture 48 up and over coil springs 16 such that each extends through one of side apertures 46 in side walls 44 of the formed V.

Made from a deformable sheet metal, retainer 42 will retain its V-shape once bent into position. Since the material does not easily spring back to its flat position, the V-shaped retainer 42 will tend to remain axially locked with respect to coil supports 16; i.e., it will not readily slide off to either side. To rotationally lock retainer 42 about the coil springs, locking tabs 50 are next bent inwardly on each side of shank 10. In the embodiments shown, locking tabs 50 are of sufficient length to bridge the spacing between side walls 44 in the assembled condition and no longer. If desired, however, locking tabs 50 can be made slightly longer such that the excess portion extending over the opposite side wall 44 can further be bent downwardly parallel to that side wall to strengthen the axial lock of retainer 42 relative to the spring coils.

In the assembled condition of FIG. 6, aperture 48 in the apex of the V of retainer 42 is aligned with shank 10 so that leader and hook structure 24,26 can be inserted therethrough to be connected to guard wire 18 in the manner described above. The size of aperture 48 determines the limit of the swing arc of the hook and leader 24,26 relative to the swallow guard, as does the length and pitch of side walls 44. Depending on the length of the leader and hook structure 24,26 being used, retainer 42 is sized such that the hook is incapable of swinging up and snagging guard wire 18.

While swing limit retainer 42 is described as comprising a deformable sheet metal, it should be understood by those skilled in the art that other materials can be used. For example, swing limit retainer could be made from a deformable plastic. In fact, the retainer does not have to be made from a material which holds its shape are deformed if locking tabs 50 are made to hold it together axially as described above.

Referring again to FIG. 5, the integral support structure 10,12,14,38,40 can be given a swing limit function by providing a rigid extension (not shown) of shank 10 at 40, extending downwardly to provide a hook support below the level of guard 38. By rigidly spacing the hook support sufficiently below guard 38, the swing limit of hook 26 is maintained below guard 38 to prevent entanglement. Of course, a swing limit retainer as disclosed above can be used with the embodiment of FIG. 5.

Figures 8, 9:
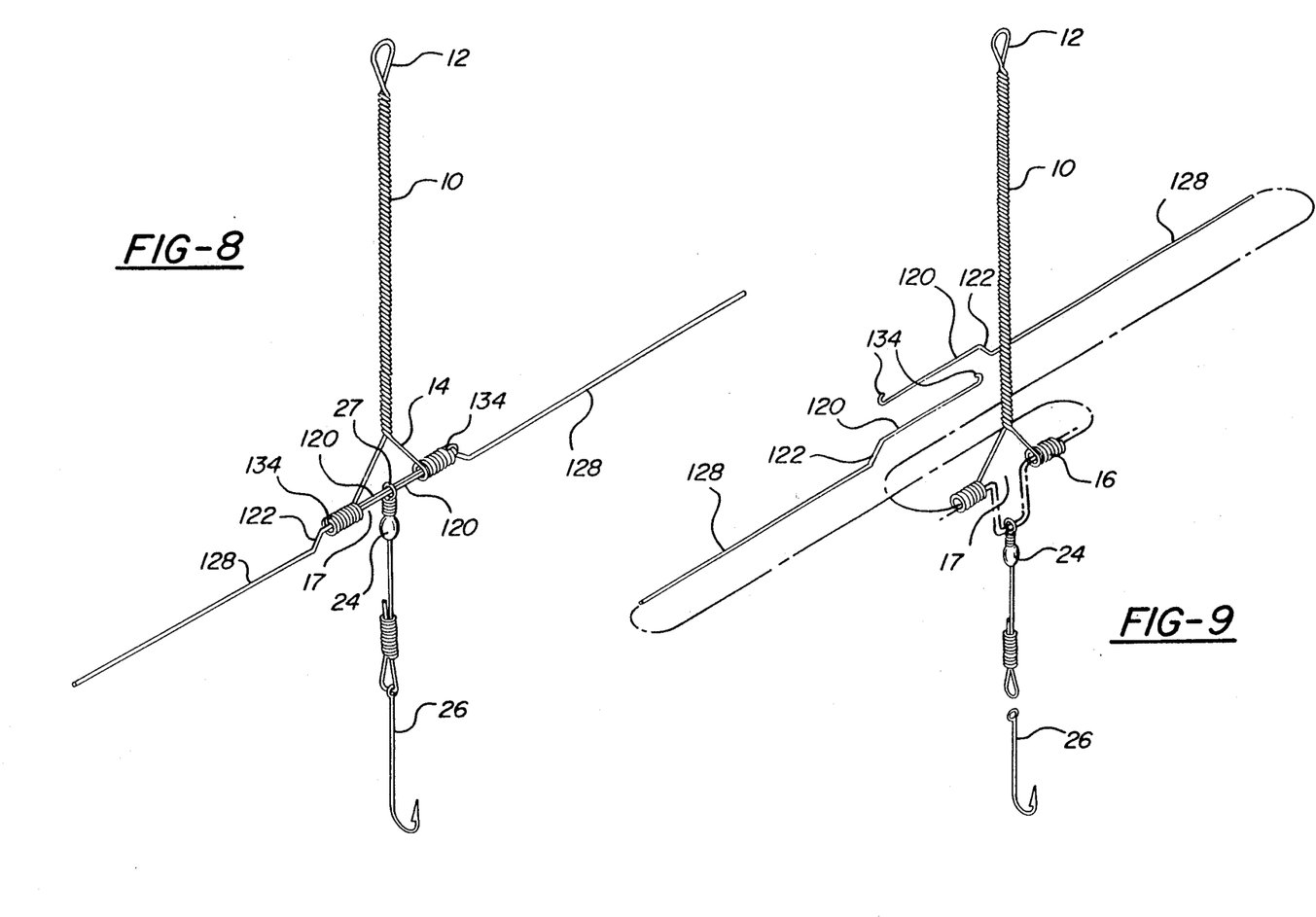
FIG. 8 is a perspective view of an alternate embodiment of the two-piece swallow guard of FIGS. 3 and 4.
FIG. 9 is an exploded perspective view of the invention of FIG. 9.

Referring to FIGS. 8 and 9, an alternate version of the two-piece swallow guard 28 in the embodiment of FIGS. 3 and 4 is shown comprising two half portions 128. Swallow guard portions 128 each comprise an offset or misaligned end portion 120 approximating the end-to-end length of coil supports 16. Each portion 128 also includes an angled cam portion 122 and an upraised hook 134.

Spring loops 32 of guard 28 in FIGS. 3 and 4 tend to interfere with swing limit retainer 42, and are difficult to close with retainer 42 in place. The embodiment of FIGS. 8 and 9, however, is particularly suitable for use with a swing limit retainer 42 such as that shown in FIGS. 6 and 7. Each portion 128 is inserted straight end first through spring coils 16 and, once inserted, remains axially locked in both directions without the need to manipulate any locking structure. Angled portion 122 axially locks swallow guard 128 in the withdrawal direction; i.e., swallow guard portion 128 cannot be withdrawn from spring coil 16 once inserted unless enough force is applied to force angled portion 122 through spring coils 16. Hook portion 134 limits the axial motion of swallow guard portion 128 through coils 16 in the insertion direction by hooking on the outside edge of the coil 16 through which it is first inserted. Since there is no spring hoop structure surrounding either spring coil 16, swallow guard portions 128 can be inserted and assembled without interfering with a swing limit retainer already in place.

As noted above in the embodiment of FIGS. 3 and 4, use of a two-piece swallow guard greatly strengthens the assembled swallow guard at its point of connection with swivel leader and hook structure 24,26, since eye 27 is supported by two thicknesses of wire.

The foregoing description of the illustrated embodiments is not intended to be limiting, as it will be understood by those skilled in the art that many variations and modifications of the invention will lie within the scope of the appended claims.

I claim:

1. A device for preventing fish from swallowing fish hooks and similar structure supported from a fishing line, comprising:
   a vertical support for connection to a fishing line at a first upper end of the support;
   lateral guard means removably connected to and extending laterally from the vertical support, the lateral guard means forming a support for a fish hook when the lateral guard means are connected to the vertical support, wherein the fish hook is pivotally connected to the lateral guard means.

2. A device for supporting fish hooks and similar structure from a fishing line in a manner to prevent fish from swallowing the hook, the device comprising:
   a vertical support for connection to a fishing line at a first upper end of the support;
   lateral guard means removably connected to and extending laterally from the vertical support; wherein,
   the lateral guard means form a pivotal support for a fish hook essentially at the junction of the lateral guard means and the vertical support.

3. Apparatus as defined in claim 2, wherein the device includes a swing limit retainer to limit the swing arc of the fish hook below the level of the lateral guard means.

4. Apparatus as defined in claim 2, wherein the swing limit retainer is removable.

5. Apparatus as defined in claim 2, wherein the swing limit retainer is supported from the lateral guard means about the pivot connection between the fish hook and the device.

6. Apparatus as defined in claim 5, wherein the swing limit retainer includes means for rotationally and axially locking the retainer relative to the vertical support.

7. Apparatus as defined in claim 5, wherein the swing limit retainer is essentially V-shaped with a swing limit aperture at the apex of the V through which the fish hook depends.

8. A device for preventing fish from swallowing fish hooks and similar structure suspended from a fishing line, comprising:
   a vertical support for connection to a fishing line at a first upper end thereof;
   lateral guard means connected to and extending crosswise from the vertical support;
   means for supporting the fish hook below the lateral guard means; wherein,
   the lateral guard means is supported at two points by lateral supports connected to the vertical support, the lateral supports comprising spaced tubular elements extending crosswise of the vertical support, the lateral guard means axially removable through the tubular supports, the lateral guard means including locking means to axially lock the lateral guard means to the tubular supports, the fish hook supported from the lateral guard means between the tubular supports.

9. Apparatus as defined in claim 8, further including a swing limit retainer.

10. Apparatus as defined in claim 8, wherein the lateral guard means comprise a one piece guard wire with a friction lock.

11. Apparatus as defined in claim 10, wherein the friction lock comprises a misaligned center portion of the wire designed to deformingly engage the lateral supports until the guard means is in the locked position.

12. Apparatus as defined in claim 8, wherein the lateral guard means comprise two guard wire portions, each portion lockable to one of the tubular supports.

13. Apparatus as defined in claim 9, wherein the swing limit retainer comprises a V-shaped housing supported from the tubular supports.

14. Apparatus as defined in claim 12, wherein each guard wire portion includes a misaligned end portion for axially locking it to the tubular supports in one direction, and a hook portion for axially locking it in the opposite direction.

15. A device for preventing fish from swallowing fish hooks and similar structure supported from a fishing line, comprising:
   a vertical support for connection to a fishing line at a first upper end of the support;
   lateral guard means connected to and extending laterally from the vertical support; wherein,
   lateral guard means are removably connected to the vertical support at two spaced points, the hook supported from the lateral guard means therebetween.

16. Apparatus as defined in claim 15, wherein the vertical support branches at a lower end to form two spaced lateral supports for the lateral guard means.

17. Apparatus as defined in claim 16, wherein the lateral supports comprise tubular elements through which the lateral guard means is removably inserted.

18. Apparatus as defined in claim 17, wherein the lateral guard means include locking means to axially lock the guard means to the tubular elements.

19. Apparatus as defined in claim 18, wherein the locking means comprise a misaligned portion to frictionally engage the tubular elements when inserted therein.

20. Apparatus as defined in claim 19, wherein the lateral guard means comprise a wire with coaxial ends and a misaligned center portion.

21. Apparatus as defined in claim 20, wherein the misaligned center portion includes angled cam portions.

22. Apparatus as defined in claim 20, wherein the misaligned center portion is offset from the coaxial ends of the guard wire a distance equal to or greater than the inner diameter of the tubular elements.

23. Apparatus as defined in claim 21, wherein the length of the misaligned center portion is approximately equal to the distance between opposite ends of the tubular elements.

24. Apparatus as defined in claim 17, wherein the lateral guard means comprise two guard wire portions, each with locking means at one end for locking to one of the lateral supports.

25. Apparatus as defined in claim 24, wherein each guard wire portion includes a misaligned end portion for axially locking it to the tubular supports in one direction, and a hook portion for axially locking it in the opposite direction.

26. Apparatus as defined in claim 24, wherein each of the lateral guard portions is inserted from opposite sides of the lateral supports, the locking means of each locked to a different one of the lateral supports.

27. Apparatus as defined in claim 26, wherein the lock means comprise a spring loop of a length at least equal to the length of one of the lateral supports, a free end of the spring loop selectively closeable to lock the lateral guard portion axially to the lateral supports.

28. A device for preventing fish from swallowing fish hooks and similar structure supported from a fishing line, comprising:
    a vertical support for connection to a fishing line at a first upper end of the support;
    tubular lateral support means connected to and extending laterally from the vertical support below said first upper end; and
    lateral guard means removably connected to the tubular lateral support means along an axis therethrough.

29. Apparatus as defined in claim 28, wherein the lateral guard means include locking means to axially lock the lateral guard means to the tubular lateral support means.

30. Apparatus as defined in claim 29, wherein the tubular support means comprise two spaced tubular elements.

31. Apparatus as defined in claim 30, wherein the lateral guard means comprise two portions, each portion with locking means at one end for locking to one of the tubular elements.

* * * * *